US010107300B2

(12) United States Patent
Xu et al.

(10) Patent No.: US 10,107,300 B2
(45) Date of Patent: Oct. 23, 2018

(54) WEAR RESISTANT MATERIAL, WEAR RESISTANT IMPELLER AND PREPARATION METHOD OF WEAR RESISTANT IMPELLER

(71) Applicant: Zhu Zhou Seed Cemented Carbide Technology Co., Ltd., ZhuZhou, HuNan (CN)

(72) Inventors: Yuehua Xu, ZhuZhou (CN); Yupeng Wang, ZhuZhou (CN); Cheng Luo, ZhuZhou (CN)

(73) Assignee: Zhu Zhou Seed Cemented Carbide Technology Co., Ltd., Zhuzhou, Hunan (CN)

( * ) Notice: Subject to any disclaimer, the term of this patent is extended or adjusted under 35 U.S.C. 154(b) by 59 days.

(21) Appl. No.: 14/908,491

(22) PCT Filed: Nov. 20, 2014

(86) PCT No.: PCT/CN2014/091792
§ 371 (c)(1),
(2) Date: Jan. 28, 2016

(87) PCT Pub. No.: WO2016/049972
PCT Pub. Date: Apr. 7, 2016

(65) Prior Publication Data

US 2016/0245295 A1 Aug. 25, 2016

(30) Foreign Application Priority Data

Sep. 30, 2014 (CN) .......................... 2014 1 0520553

(51) Int. Cl.
*B32B 15/00* (2006.01)
*F04D 29/22* (2006.01)
(Continued)

(52) U.S. Cl.
CPC ........ *F04D 29/2294* (2013.01); *B22F 3/1007* (2013.01); *B22F 3/1017* (2013.01);
(Continued)

(58) Field of Classification Search
CPC .... F04D 29/2294; F04D 29/2227; B22F 7/08; C22C 19/03; C22C 19/05; C22C 30/00;
(Continued)

(56) References Cited

U.S. PATENT DOCUMENTS

| | | | |
|---|---|---|---|
| 3,814,447 A | 6/1974 | Prasse et al. | |
| 4,427,446 A | 1/1984 | Miura et al. | |
| 2011/0067796 A1* | 3/2011 | Belhadjhamida ..... | B22F 3/1017 156/62.2 |

FOREIGN PATENT DOCUMENTS

| | | |
|---|---|---|
| CN | 1316548 A * | 10/2001 |
| CN | 101100719 A | 1/2008 |

(Continued)

OTHER PUBLICATIONS

Hida Osamu, Description Machine Translation, Nov. 25, 1992.*
(Continued)

*Primary Examiner* — David Sample
*Assistant Examiner* — Mary I Omori
(74) *Attorney, Agent, or Firm* — Knobbe, Martens, Olson & Bear, LLP

(57) ABSTRACT

A wear resistant material is manufactured from a Ni-based alloy powder and an additive. The Ni-based alloy powder includes the following components in mass fraction: C: 0.1~1.1%, Si: 0.5~6.0%, Fe: 2.5~15.0%, B: 0.2~5.0%, $CrB_2$: 6.0~26.0%, and the balance of Ni. The Ni-based alloy powder is employed as the main component and $CrB_2$ and WC are added, thus improving the wear resistance of the wear resistant material. Experimental data show that, the wear resistant material provided in the present disclosure has
(Continued)

the hardness up to 70~80 HRC and excellent wear resistance. A wear resistant impeller can be manufactured from the wear resistant material.

7 Claims, 2 Drawing Sheets

(51) Int. Cl.

| | |
|---|---|
| ***B22F 7/08*** | (2006.01) |
| ***C22C 19/05*** | (2006.01) |
| ***C22C 30/00*** | (2006.01) |
| ***C22C 19/03*** | (2006.01) |
| ***C22C 32/00*** | (2006.01) |
| ***F04D 29/02*** | (2006.01) |
| ***C23C 24/10*** | (2006.01) |
| ***B22F 3/10*** | (2006.01) |
| *C23C 24/08* | (2006.01) |
| *F04D 13/10* | (2006.01) |

(52) U.S. Cl.
CPC ................ *B22F 7/08* (2013.01); *C22C 19/03* (2013.01); *C22C 19/05* (2013.01); *C22C 30/00* (2013.01); *C22C 32/0047* (2013.01); *C22C 32/0073* (2013.01); *C22C 32/0094* (2013.01); *C23C 24/103* (2013.01); *F04D 29/026* (2013.01); *F04D 29/2227* (2013.01); *B22F 2999/00* (2013.01); *C23C 24/087* (2013.01); *F04D 13/10* (2013.01); *F05D 2230/41* (2013.01)

(58) Field of Classification Search
CPC .. C22C 23/0073; C23C 24/103; C23C 24/087
USPC ........................................................ 428/680
See application file for complete search history.

(56) References Cited

FOREIGN PATENT DOCUMENTS

| | | | | |
|---|---|---|---|---|
| CN | 102337534 | A | | 2/2012 |
| CN | 102383126 | A | * | 3/2012 |
| CN | 102943199 | A | | 2/2013 |
| CN | 103866319 | A | | 6/2014 |
| JP | H-04337046 | A | | 11/1992 |
| JP | H08319530 | A | | 12/1996 |
| WO | 2008/005243 | A3 | | 1/2008 |

OTHER PUBLICATIONS

Ding Gang, Description Machine Translation, Feb. 27, 2013.*
Shengfeng Zhou, Description Machine Translation, Mar. 21, 2012.*
Chimura et al., Machine translation of JPH08319530 Description, Dec. 3, 1996 (Year: 1996).*
Technical Data Deloro 33 Alloy, Deloro Wear Solutions.*
Wu et al., Machine translation of CN 1316548 Abstract and Description, Oct. 10, 2001 (Year: 2001).*

* cited by examiner

WEAR RESISTANT MATERIAL, WEAR RESISTANT IMPELLER AND PREPARATION METHOD OF WEAR RESISTANT IMPELLER

The present application is the U.S. National Phase under 35. U.S.C. § 371 of International Application PCT/CN2014/091792, filed Nov. 20, 2014, which claims the priority of Chinese patent application 201410520553.X filed at State Intellectual Property Office on Sep. 30, 2014, and entitled "WEAR RESISTANT MATERIAL, WEAR RESISTANT IMPELLER AND PREPARATION METHOD OF WEAR RESISTANT IMPELLER" which is incorporated herein by reference in its entirety.

FIELD

The present disclosure belongs to the field of petroleum exploitation, and in particular relates to a wear resistant material, a wear resistant impeller and a preparation method of the wear resistant impeller.

BACKGROUND

In petroleum exploitation, submersible pump is one of the main apparatuses. Submersible pump, which is a multi-stage centrifugal pump, consists of multistage impellers, guide shell, pump shaft, pump housing, upper and lower joints and the like. As an important mechanical oil production apparatus, submersible pump has been widely used and developed in oilfield area at home and abroad.

The operating principle of the submersible pump is the same as that of the common ground centrifugal pump. Before starting submersible pump, pump body and suction line are filled with well fluid. After the unit in the oil well is started, submersible motor transfers mechanical energy to the submersible pump to rotate the pump shaft and the impellers on the pump shaft of the submersible pump at a high speed. The blades of the impellers drive the well fluid in the flow channel of the impellers to rotate. The liquid is thrown from the center of the impeller to the edge of the impeller due to the centrifugation force, accompanied by an increase of the kinetic energy. After the fluid enters the pump housing, since the flow channel is gradually expanded in the spiral-shaped pump housing, the flow speed of the liquid is gradually reduced, and a portion of the kinetic energy is converted into static energy, and thus the liquid flows out through the exit outlet at a higher pressure. At the same time, vacuum is formed in the center of the impeller because the liquid is thrown off. The pressure at the liquid level is higher than that at the center of the impeller. Therefore, the liquid in the suction line flows into the pump body under pressure difference. The well fluid flows through all impellers in the pump stage by stage and is pumped to ground oil collecting system.

During the operation of the submersible pump, the impellers are severely worn under the long term impact of the well fluid, and the possible solid impurity in the well fluid also aggravates such impact wear, which may change the main geometric dimensioning of the impellers and guide shell, reducing the service life of the submersible pump or even causing the submersible pump failure. Therefore, it is necessary to improve wear resistance of the impeller. However, if the impellers are manufactured by using material having higher hardness and wear resistance to solve the above problem, the manufacture process for the impellers becomes more difficult and complex, which is also not reasonable in terms of economy.

In the prior art, the surface of the impeller is usually modified, and a layer of wear resistant material is surfacing welded or spray welded (spray coated) onto the severely worn section of the impeller, so as to improve the wear resistance of the impeller. However, the existing wear resistant material has main components of Fe, Mo or Cr, which exhibits limited wear resistance and a hardness of 55~65 HRC, and thus does not satisfy the production requirements.

SUMMARY

An object of the present disclosure is to provide a wear resistant material, a wear resistant impeller and a method for manufacturing the same. The wear resistant material provided in the present disclosure has excellent wear resistance.

The present disclosure provides a wear resistant material manufactured from a Ni-based alloy powder and an additive;

wherein the Ni-based alloy powder comprises the following components in mass fraction:

C: 0.1~1.1%, Si: 0.5~6.0%, Fe: 2.5~15.0%, B: 0.2~5.0%, $CrB_2$: 6.0~26.0%, and the balance of Ni.

Preferably, the Ni-based alloy powder comprises the following components in mass fraction:

C: 0.2~1.0%, Si: 1~5%, Mo: 0.1~4.0%, WC: 0.1~20.0%, Fe: 3.0~14.0%, B: 0.3~4.5%, $CrB_2$: 6.5~25.0%, and the balance of Ni.

Preferably, the additive comprises one or more of glycerol trioleate, polyvinyl butyral, ethyl cellulose, polyvinyl acetate, methyl ester, vinyl ester, anhydrous ethyl alcohol, butanone, di-n-octyl phthalate, glycerol, glycerin, and cyclohexanone.

Preferably, the mass fraction of the Ni-based alloy powder is 40~80%; and the mass fraction of the additive is 20~60%.

Preferably, the wear resistant material has a density of 7.80~8.10 g/cm$^3$.

Preferably, the wear resistant material has a porosity of 0~4%.

The present disclosure provides a wear resistant impeller having a hard surface layer on the surface of the impeller, wherein the hard surface layer is made from the wear resistant material according to the above technical solutions.

Preferably, the hard surface layer has a thickness of 0.02~0.3 mm.

The present disclosure provides a method for manufacturing wear resistant impeller, comprising the following steps:

A) mixing a Ni-based alloy powder and an additive to obtain a slurry, wherein the Ni-based alloy powder comprises the following components in mass fraction: C: 0.1~1.1%, Si: 0.5~6.0%, Fe: 2.5~15.0%, B: 0.2~5.0%, $CrB_2$:6.0~26.0%, and the balance of Ni;

B) loading the slurry obtained in the step A) onto the surface of an impeller to obtain a half-finished wear resistant impeller; and C) subjecting the half-finished wear resistant impeller obtained in the step B) to a vacuum fusion sintering to obtain a wear resistant impeller.

Preferably, the vacuum fusion sintering is specifically as follows:

1) increasing the temperature for the vacuum fusion sintering to 150~250° C. within 20~40 minutes, and maintaining this temperature for 5~30 minutes;

2) further increasing the temperature to 300~350° C. within 30~60 minutes, and maintaining this temperature for 10~20 minutes;

3) further increasing the temperature to 400~500° C. within 60~90 minutes, and maintaining this temperature for 10~30 minutes;

4) further increasing the temperature to 700~900° C. within 30~70 minutes, and maintaining this temperature for 5~10 minutes;

5) further increasing the temperature to 900~1000° C. within 30~60 minutes, and maintaining this temperature for 5~15 minutes; and 6) further increasing the temperature to 1050~1200° C. within 30~60 minutes, and maintaining this temperature for 5~15 minutes.

The present disclosure provides a wear resistant material manufactured from a Ni-based alloy powder and an additive, wherein the Ni-based alloy powder comprises the following components in mass fraction: C: 0.1~1.1%, Si: 0.5~6.0%, Fe: 2.5~15.0%, B: 0.2~5.0%, $CrB_2$: 6.0~26.0%, and the balance of Ni. In the present disclosure, the Ni-based alloy powder is used as the main component, and thus the wear resistance of the wear resistant material is improved. Experimental data show that, the wear resistant material provided in the present disclosure has hardness up to 70~80 HRC and excellent wear resistance. The present disclosure also provides a wear resistant impeller and manufacture method thereof, wherein the wear resistant material provided in the present disclosure is used as the hard surface layer of the wear resistant impeller, and the wear resistant material is loaded onto the surface of the impeller matrix to obtain a blank, the blank is then converted into finished product via vacuum fusion sintering, the hard surface layer formed from the wear resistant material of the present disclosure has more homogeneous structure and metallurgical bonding between the hard surface layer and the surface of the impeller matrix. The obtained hard surface layer has dense structure and homogeneous tissue and enhanced bonding strength between the hard surface layer and the surface of the impeller, thus the wear resistance of the wear resistant impeller is further improved.

BRIEF DESCRIPTION OF THE DRAWINGS

In order to more clearly illustrate the technical solutions in the examples of the present disclosure, figures are provided in the present disclosure. The figures are provided merely as examples of the present disclosure, and those skilled in the air can obtain other figures in the light of the figures provided in the present disclosure without any creative work, in which.

DETAILED DESCRIPTION

Figure 1:
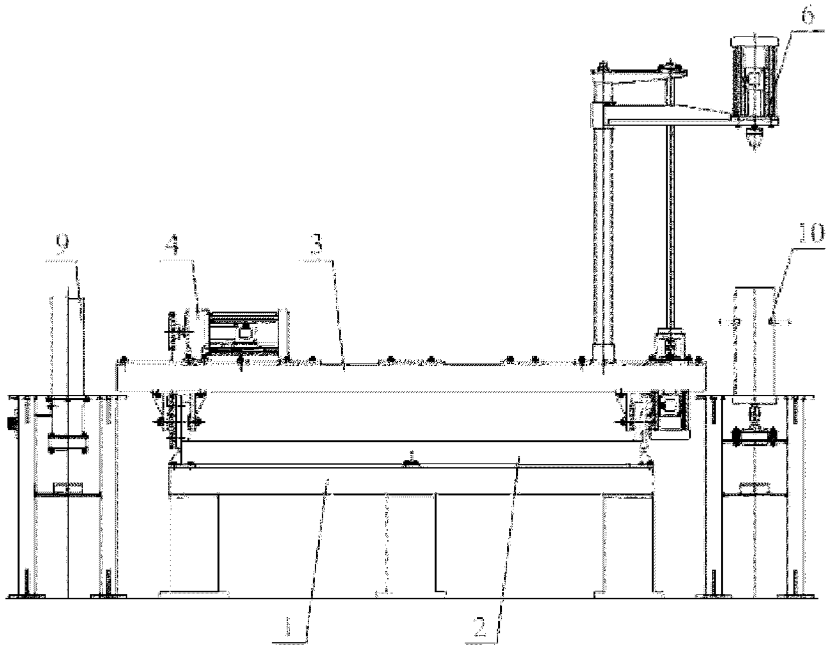
FIG. 1 is a structure diagram of the loading apparatus of the present disclosure.

The present disclosure provides a wear resistant material manufactured from a Ni-based alloy powder and an additive, wherein the Ni-based alloy powder comprises the following components in mass fraction: C: 0.1~1.1%, Si: 0.5~6.0%, Fe: 2.5~15.0%, B: 0.2~5.0%, $CrB_2$: 6.0~26.0%, and the balance of Ni.

The wear resistant material provided in the present disclosure has excellent wear resistance.

In the present disclosure, the density of the wear resistant material is preferably 7.80~8.10 g/cm$^3$, and more preferably 7.00~8.0 g/cm$^3$; the porosity of the wear resistant material is preferably 0~4%, more preferably 0.5~3.5%, and most preferably 1~3%; the mass fraction of the Ni-based alloy powder is preferably 40~80%, more preferably 45~75%, and most preferably 50~70%; the mass fraction of the additive is preferably 20~60%, more preferably 25~55%, and most preferably 30~50%.

The wear resistant material provided in the present disclosure is manufactured from a Ni-based alloy powder and an additive, wherein the Ni-based alloy powder comprises C, and the mass fraction of the C is 0.1~1.1%, preferably 0.2~1.0%, and more preferably 0.3~0.9%, and preferably the C used in the present disclosure is carbon powder.

In the present disclosure, the Ni-based alloy powder comprises Si, and the mass fraction of the Si is 0.5~6.0%, preferably 1.0~5.0%, and more preferably 2.0~4.0%, and preferably the Si used in the present disclosure is silicon powder.

In the present disclosure, the Ni-based alloy powder comprises Fe, and the mass fraction of the Fe is 2.5~15%, preferably 3~14%, and more preferably 4~13%, and preferably the Fe used in the present disclosure is iron powder.

In the present disclosure, the Ni-based alloy powder comprises B (boron), and the mass fraction of the B is 0.2~5.0%, preferably 0.3~4.5%, and more preferably 1~4%, and preferably the B used in the present disclosure is boron powder.

In the present disclosure, the Ni-based alloy powder comprises $CrB_2$ (chromium boride), and the mass fraction of the $CrB_2$ is 6~26%, preferably 6.5~25%, and more preferably 7~24%. The present disclosure has no limitation to the source and form of the $CrB_2$, and the $CrB_2$ commonly used in the art can be used.

In the present disclosure, the Ni-based alloy powder comprises Ni, and the sum of the mass fraction of the Ni and the mass fraction of other components in the Ni-based alloy powder is 100%. Preferably the Ni used in the present disclosure is nickel powder.

In the present disclosure, preferably the Ni-based alloy powder further comprises Mo, and the mass fraction of the Mo is 0.1~4.0%, preferably 0.2~3.8%, and more preferably 0.5~3.5%, and preferably the Mo used in the present disclosure is molybdenum powder.

In the present disclosure, preferably the Ni-based alloy powder also comprises MC (tungsten carbide), and the mass fraction of the WC is 0.1~20.0%, preferably 0.5~19.0%, and more preferably 2.0~18.0%, and preferably the WC used in the present disclosure is tungsten carbide powder.

In addition to the Ni-based alloy powder, the wear resistant material further comprises an additive, wherein the additive promotes the hard surface forming between the Ni-based alloy powder and the matrix material and facilitates effective metallurgical bonding such that the wear resistant material has excellent wear resistance.

In the present disclosure, the additive preferably comprises a binder such that the wear resistant material has more homogeneous structure and stronger adhesion on the surface of the impeller. In the present disclosure, the additive is preferably one or more of polyvinyl butyral, ethyl cellulose, polyvinyl acetate, methyl ester and vinyl ester, more preferably one or more of polyvinyl butyral, polyvinyl acetate and vinyl ester, and most preferably polyvinyl acetate and/or vinyl ester. In the present disclosure, the mass fraction of the binder in the additive is preferably 3~15%, more preferably 4~13%, and most preferably 5~10%. The present disclosure has no particular limitation to the source of the binder, and the binder commercially available can be used.

In the present disclosure, the additive preferably comprises a solvent such that each component in the Ni-based alloy powder can dispersed and dissolved sufficiently and the solvent can be volatilized completely during the vacuum fusion sintering to guarantee non-defective curing of the hard surface coating. In the present disclosure, the solvent is preferably anhydrous ethyl alcohol and/or butanone, and more preferably anhydrous ethyl alcohol. In the present disclosure, the mass fraction of the solvent in the additive is preferably 70~95%, and more preferably 75~90%.

In the present disclosure, the additive preferably comprises a plasticizer to improve the distribution of the binder in the wear resistant material. In the present disclosure, the plasticizer is preferably one or more of di-n-octyl phthalate, glycerol and glycerin. In the present disclosure, the mass fraction of the plasticizer in the additive is preferably 0.5~5%, and more preferably 1~4%.

In the present disclosure, the additive preferably comprises a leveling agent (homogenizer) in order that each component of the Ni-based alloy powder can be distributed more uniformly such that the performance is more stable. The leveling agent is preferably cyclohexanone, and the mass fraction of the leveling agent in the additive is preferably 0.1~1%, and more preferably 0.3~0.8%. The present disclosure has no limitation to the source of the leveling agent, and the leveling agent well known to those skilled in the art can be used.

The dispersion of powder particle in liquid is typically unstable and non-uniform. In order to control the agglomeration extent of the particles and the strength of the aggregate, the additive preferably comprises a dispersant, wherein the dispersant is preferably one or more of ethylene bisstearamide, glyceryl monostearate and glycerol trioleate, and more preferably glycerol trioleate. In the present disclosure, the mass fraction of the dispersant is preferably 0.1~1%, and more preferably 0.2~0.8%. The present disclosure has no particular limitation to the source of the dispersant, and commercially available dispersant can be used.

The present also provides a wear impeller having a hard surface layer on the surface thereof, wherein the hard surface layer is made from the wear resistant material according to the above technical solutions. In the present disclosure, the thickness of the hard surface layer is preferably 0.02~0.3 mm, more preferably 0.05~0.25 mm and most preferably 0.1~0.2 mm. The present disclosure has no limitation to the type and material of the impeller, and preferably the impeller in submersible pump is used.

The present disclosure further provides a method for manufacturing wear resistant impeller, comprising the following steps:

A) mixing a Ni-based alloy powder and an additive to obtain a slurry, wherein the Ni-based alloy powder comprises the following components in mass fraction: C: 0.1~1.1%, Si: 0.5~6.0%, Fe: 2.5~15.0%, B: 0.2~5.0%, $CrB_2$: 6.0~26.0%, and the balance of Ni;

B) loading the slurry obtained in the step A) onto the surface of an impeller to obtain a half-finished wear resistant impeller;

C) subjecting the half-finished wear resistant impeller obtained in the step B) to a vacuum fusion sintering to obtain a wear resistant impeller.

In the present disclosure, a Ni-based alloy powder and an additive are mixed to obtain a slurry. In the present disclosure, the types and amounts of the additive are the same as those in the above technical solution, and thus detailed description thereof is omitted; and the types and amounts of the Ni-based alloy powder are the same as those in the above technical solution, and thus detailed description thereof is omitted. The present disclosure has no particular limitation to the source of the Ni-based alloy powder, and the Ni-based alloy powder is preferably prepared by the follow steps:

mixing in mass fraction 0.1~1.1% of C, 0.5~6.0% of Si, 2.5~15.0% of Fe, 0.2~5.0% of B, 6.0~26.0% of CrB2, and the balance of Ni to obtain a mixture; and pulverizing the mixture to obtain a Ni-based alloy powder.

In the present disclosure, preferably 0.1~1.1% of C, 0.5~6.0% of Si, 0.5~4.0% of Mo, 0.5~20.0% of WC, 2.5~15.0% of Fe, 0.2~5.0% of B, 6.0~26.0% of $CrB_2$ and the balance of Ni are mixed to obtain a mixture. The sources and amounts of the C, Si, Mo, WC, Fe, B, $CrB_2$ and Ni are the same as the sources and amounts of the C, Si, Mo, WC, Fe, B, $CrB_2$ and Ni in the above technical solutions, and thus detailed description thereof is omitted. The present disclosure has no particular limitation to the method for mixing the C, Si, Mo, WC, Fe, B, $CrB_2$ and Ni, and the conventional mixing method in the art can be used.

After the mixture is obtained, in the present disclosure, the mixture is preferably pulverized to obtain the Ni-based alloy powder. In the present disclosure, preferably the mixture and anhydrous ethyl alcohol are mixed to obtain a mixture slurry, and the mixture slurry is pulverized to obtain the Ni-based alloy powder. In the present disclosure, the usage amount of the anhydrous ethyl alcohol is preferably 500~1000 mL, more preferably 550~950 mL, and most preferably 600~900 mL based on per kg mixture. The present disclosure has no particular limitation to the method for mixing the mixture and the anhydrous ethyl alcohol, as long as the mixture and ethyl alcohol are mixed homogeneously.

After mixing of the mixture and anhydrous ethyl alcohol, in the present disclosure, the mixture slurry is preferably pulverized to obtain the Ni-based alloy powder. In the present disclosure, the mixture slurry is preferably pulverized by wet milling. In the present disclosure, the time of the wet milling is preferably 24~40 hours, more preferably 25~38 hours, and most preferably 28~35 hours. The present disclosure has no particular limitation to the apparatus for wet milling, and the apparatus well known to those skilled in the art can be used.

After wet milling, in the present disclosure, the Ni-based alloy powder obtained by wet milling is preferably dried to obtain dried Ni-based alloy powder. In the present disclosure, the temperature for the drying is preferably 80~200° C., more preferably 90~180° C., and most preferably 100~170° C.; the time for the drying is preferably 1~4 hours, more preferably 1.2~3.5 hours, and most preferably 1.5~3 hours. The present disclosure has no particular limitation to the apparatus for the drying, and vacuum drying oven is preferably used for such drying in the present disclosure.

After the drying, in the present disclosure, the dried Ni-based alloy powder obtained is sieved to obtain sieved Ni-based alloy powder. In the present disclosure, the sieved particle size is preferably 60~100 mesh, more preferably 65~95 mesh, and most preferably 70~90 mesh. The present disclosure has no limitation to the sieving times, as long as desired particle size of Ni-based alloy powder can be obtained after sieving. The present disclosure has no limitation to the apparatus for sieving, and the sieving apparatus well known to those skilled in the art can be used.

The sieved Ni-based alloy powder is mixed with the additive, 200~600 mL additive is added into 1 kg of the sieved Ni-based alloy powder, to obtain the slurry. Then, the slurry is loaded onto the surface of the impeller to obtain the half-finished wear resistant impeller. In the present disclosure, the loading preferably comprises the following steps:

the impeller is sequentially subjected to a first cleaning, a second cleaning, a first drying, a first hanging (attaching), a second drying, a second hanging, and a third drying, to obtain a loaded workpiece.

In the present disclosure, the impeller is preferably subjected to the first cleaning so as to remove the greasy dirt and impurities on the surface of the impeller, to obtain a first-cleaned impeller. In the present disclosure, the time for the first cleaning is preferably 1~5 minutes, more preferably 1.5~4.5 minutes, and most preferably 2~4 minutes; the temperature for the first cleaning is preferably 30~80° C., more preferably 35~75° C., and most preferably 50~65° C. In the present disclosure, a first cleaning liquid is preferably used to perform the first cleaning of the impeller, and the first cleaning liquid is preferably G105 Metal Cleaner (environment friendly universal type) produced by the China Aviation Supplies Aviation material Co. LTD.

After the first cleaning, in the present disclosure, the impeller obtained after the first cleaning is subjected to the second cleaning to remove residual impurities on the surface of the impeller, to obtain a second-cleaned impeller. In the present disclosure, an ultrasonic cleaning is preferably used to perform the second cleaning of the first-cleaned impeller to obtain the second-cleaned impeller. In the present disclosure, the time for the second cleaning is preferably 1~5 minutes, more preferably 1.5~4.5 minutes, and most preferably 2~4 minutes; and the temperature for the second cleaning is preferably 30~80° C., more preferably 35~75° C., and most preferably 50~55° C. The power of the ultrasonic is preferably 1~500 W, more preferably 10~450 W, 100~400 W. In the present disclosure, a second cleaning liquid is preferably used to perform the second cleaning of the impeller, and the second cleaning liquid is preferably SC-2000 solvent-based cleaning agent (for ultrasonic, odorless, colorless and quick drying).

After the second cleaning, in the present disclosure, the impeller obtained after the second cleaning is subjected to a first drying to remove moisture and low temperature volatile material on the surface of the impeller, to obtain the first dried impeller. In the present disclosure, the time for the first drying is preferably 1~3 minutes, more preferably 1.5~2.5 minutes, and most preferably 1.8~2.2 minutes; and the temperature for the first drying is preferably 50~100° C., more preferably 55~95° C., and most preferably 60~90° C.

After the first drying, in the present disclosure, the first dried impeller is subjected to a first hanging to obtain a first hanged impeller. In the present disclosure, preferably the impeller is rotated in the slurry for the first hanging to obtain the first hanged impeller. In the present disclosure, the time for the first hanging is preferably 1~10 minutes, more preferably 2~9 minutes, and most preferably 3~8 minutes; the concentration of the slurry for the first hanging is preferably 65%; and the rotation speed of the impeller in the slurry for the first hanging is preferably 300~600 r/min, more preferably 320~550 r/min, and most preferably 350~500 r/min.

After the first hanging, in the present disclosure, the impeller obtained after the first hanging is subjected to a second drying for forming uniform slurry basal membrane on the surface of the workpiece, to obtain the second dried impeller. In the present disclosure, the time for the second drying is preferably 1~3 minutes, more preferably 1.5~2.5 minutes, and most preferably 1.8~2.2 minutes; and the temperature for the second drying is preferably 50~100° C., more preferably 55~95° C., and most preferably 60~90° C.

After the second drying, in the present disclosure, the impeller obtained after the second drying is subjected to the second hanging for achieving desired thickness of the slurry on the surface of the impeller, to obtain a second hanged impeller. In the present disclosure, the impeller is rotated in the slurry for the second hanging to obtain the second hanged impeller. In the present disclosure, the time for the second hanging is preferably 1~10 minutes, more preferably 2~9 minutes, and most preferably 3~8 minutes; the concentration of the slurry for the second hanging is preferably 75%; and the rotation speed of the impeller in the slurry for the second hanging is preferably 300~600 r/min, more preferably 320~550 r/min, and most preferably 350~500 r/min.

After the second hanging, in the present disclosure, the impeller obtained after the second hanging is preferably subjected to the third drying for curing the slurry on the surface of the impeller, to obtain the loaded impeller. In the present disclosure, the time for the third drying is preferably 1~3 minutes, more preferably 1.5~2.5 minutes, and most preferably 1.8~2.2 minutes; and the temperature for the third drying is preferably 50~100° C., more preferably 55~95° C., and most preferably 60~90° C.

In the present disclosure, the loading apparatus preferably comprises a cleaning apparatus, a hanging apparatus and a drying apparatus, in which a workpiece receiving tank for receiving the workpiece is provided in the hanging apparatus and slurry for hanging is provided in the workpiece receiving tank.

Figure 2:
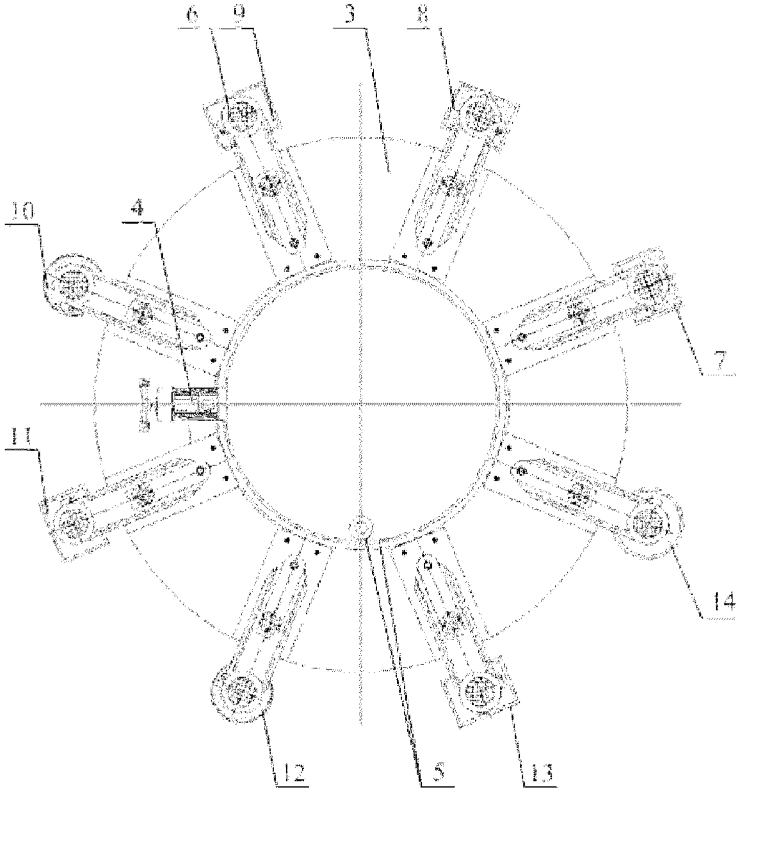
FIG. 2 is a top view of the loading apparatus of the present disclosure.

In the present disclosure, preferably the loading apparatus as shown in FIGS. 1 and 2 is used, in which FIG. 1 is a structure diagram of the loading apparatus of the present disclosure, and FIG. 2 is a top view of the loading apparatus of the present disclosure. In FIGS. 1~2: 1—an annular pedestal, 2—a circular track, 3—a rotating platform, 4—a driving means, 5—a sliding contact line, 6—mechanical arm, 7—the first cleaning apparatus, 8—the second cleaning apparatus, 9—the first drying apparatus, 10—the first hanging apparatus, 11—the second drying apparatus, 12—the second hanging apparatus, 13—the third drying apparatus, and 14—clamping apparatus.

As shown in FIGS. 1 and 2, the loading apparatus comprises a cleaning apparatus, a hanging apparatus and a drying apparatus, in which the hanging apparatus is provided with a workpiece receiving tank for receiving the workpiece. Wherein the cleaning apparatus may be conventional cleaning apparatus. When the workpiece needs to be processed, the workpiece is placed into the workpiece receiving tank of the hanging apparatus such that the material is hang/attached onto the surface of the workpiece and then the workpiece is taken out at the end of the hanging process.

According to the above description, in the loading apparatus provided in the present disclosure, the hanging/attachment is performed by placing the workpiece in the hanging apparatus containing slurry for hanging so as to hang/attach the material onto the surface of the workpiece sufficiently and uniformly. Compared to the loading apparatus in the prior art, the present disclosure overcomes the difficulty in coating the angled region of workpiece in the manual coating process, and the loading apparatus used in the present disclosure improves the processing quality and the process efficiency of the workpiece.

Preferably, the loading apparatus further comprises mechanical arms 6 for moving upwardly/downwardly and rotating the workpiece, and a controller for controlling the trajectory of the mechanical arms 6. The cleaning machine comprises the first cleaning apparatus 7 and the second cleaning apparatus 8. The mechanical arms 6 are provided with straight-line mechanisms for controlling the lifting of the workpiece, and motors for controlling the rotation of the workpiece, wherein the straight-line mechanisms can be telescopic link or a telescopic cylinder and the like.

The first cleaning apparatus 7 comprises a first cleaning box containing cleaning liquid, a circulating pump mounted in the first cleaning box, a first initial sensor for detecting whether the workpiece is positioned directly above the first cleaning box or not, and a first working sensor for detecting whether the workpiece is positioned in the cleaning liquid or not. When the mechanical arm 6 mounted with the workpiece moves directly above the first cleaning apparatus, the signal of the first initial sensor changes, then the mechanical arm 6 receives instruction from the controller and moves the workpiece downwardly, until the workpiece is dropped into the first cleaning box, the controller receives signal from the first working sensor and controls the mechanical arm 6 to stop moving the workpiece downwardly and controls the circulating pump to work for a first preset time, wherein the first preset time is controlled by a timer and which depends on the requirements for cleaning different workpieces. After the circulating pump stops working, the mechanical arm 6 receives instruction from the controller and moves the workpiece upwardly. When sensing the workpiece, the first initial sensor sends a finishing signal to the controller, and the mechanical arm 6 stops moving the workpiece upwardly after receiving instruction from the controller. When the mechanical arm 6 having no workpiece moves directly above the first cleaning apparatus, the first initial sensor detects no workpiece and directly sends the finishing signal.

The second cleaning apparatus 8 comprises: ultrasonic cleaning part, a second cleaning box receiving cleaning liquid, a second initial sensor for detecting whether the workpiece is positioned directly above the first cleaning box or not, and a second working sensor for detecting whether the workpiece is positioned in the cleaning liquid or not. Preferably, the power of the ultrasonic of the second cleaning apparatus 8 can be adjusted continuously within 0-500 W to meet the requirement for cleaning different types of workpieces. After the mechanical arm 6 mounted with the workpiece moves directly above the second cleaning apparatus, the signal of the second initial sensor changes, then the mechanical arm 6 receives instruction from the controller and moves the workpiece downwardly, until the workpiece is dropped into the second cleaning box, the controller receives signal from the second working sensor and controls the mechanical arm 6 to stop moving the workpiece downwardly and controls the ultrasonic cleaning part to work for a second preset time, wherein the second preset time is controlled by a timer and which depends on the requirements for cleaning different workpieces. After the circulating pump stops working, the mechanical arm 6 receives instruction from the controller and moves the workpiece upwardly. When sensing the workpiece, the second initial sensor sends a finishing signal to the controller, and the mechanical arm 6 stops moving the workpiece upwardly after receiving instruction from the controller. When the mechanical arm 6 having no workpiece moves directly above the second cleaning apparatus 8, the second initial sensor detects no workpiece and directly sends the finishing signal.

The first cleaning apparatus 7 is provided for cleaning the greasy dirt and impurities on the surface of the workpiece, and the second cleaning apparatus 8 is provided for cleaning the impurities on the surface of the workpiece. The cleaning process is controlled by the controller, which reduces the labor intensity of the operator.

Furthermore, the hanging apparatus comprises a first hanging apparatus 10 and a second hanging apparatus 12 both provided with workpiece receiving tank, wherein the first hanging apparatus 10 comprises a first material barrel, a first hovering position sensor, a first automatic stirrer mounted in the first material barrel, a third initial sensor for detecting whether the workpiece is positioned directly above the first material barrel or not, and a third working sensor for detecting whether the workpiece is positioned in the workpiece receiving tank or not, wherein the workpiece receiving tank here refers to the workpiece receiving tank on the first material barrel. When the mechanical arm 6 mounted with the workpiece moves directly above the first hanging apparatus 10, the mechanical arm 6 receives instruction from the controller and moves the workpiece downwardly, until the workpiece is dropped into the workpiece receiving tank, the controller receives signal from the third working sensor and controls the mechanical arm 6 to stop moving the workpiece downwardly and controls the first automatic stirrer to work for a third preset time, wherein the third preset time is controlled by a timer and which depends on the hanging requirements for different workpieces. After the first automatic stirrer stops working, the mechanical arm 6 receives instruction from the controller and moves the workpiece upwardly. When the workpiece moves to the first hovering position sensor, the controller receives the signal from the first hovering position sensor, controls the mechanical arm 6 to stop moving upwardly and rotates the workpiece at throwing speed for a forth preset time, wherein the throwing speed is a speed at which excess feed liquid on the surface of the workpiece can be thrown away, in particular, the throwing speed can be 1000-1200 r/min, but it is not limited thereto, wherein the forth preset time is controlled by a timer and which depends on the requirements for different workpieces. When the preset time is finished, the mechanical arm 6 receives instruction from the controller and moves the workpiece upwardly till the position of the third initial sensor. When sensing the workpiece, the third sensor sends a finishing signal to the controller, and the mechanical arm 6 stops moving the workpiece upwardly after receiving instruction from the controller. When the mechanical arm 6 having no workpiece moves directly above the first hanging apparatus 10, the third initial sensor detects no workpiece and directly sends the finishing signal.

The second hanging apparatus 12 comprises a second material barrel, a second automatic stirrer mounted in the second material barrel, a second hovering position sensor, a forth initial sensor for detecting whether the workpiece is positioned directly above the second material barrel or not, and a forth working sensor for detecting whether the workpiece is positioned in the workpiece receiving tank or not, wherein the workpiece receiving tank here refers to the workpiece receiving tank on the second material barrel. When the mechanical arm 6 mounted with the workpiece moves directly above the second hanging apparatus 12, the mechanical arm 6 receives instruction from the controller and moves the workpiece downwardly, until the workpiece is dropped into the workpiece receiving tank, the controller receives signal from the fifth working sensor and controls the mechanical arm 6 to stop moving the workpiece downwardly and controls the second automatic stirrer to work for a fifth preset time, wherein the fifth preset time is controlled by a timer and which depends on the hanging requirements for different workpieces. When the second automatic stirrer stops working after the preset time, the mechanical arm 6 receives instruction from the controller and moves the workpiece upwardly. The controller controls the mechanical arm 6 to stop moving upwardly after receiving the signal from the second hovering position sensor, and controls the mechanical arm 6 to rotate the workpiece at throwing speed for a sixth preset time, wherein the sixth preset time is controlled by a timer. When the sixth preset time is finished, the mechanical arm 6 receives instruction from the controller and moves the workpiece upwardly till the position of the forth initial sensor. When sensing the workpiece, the forth sensor sends a finishing signal to the controller, and the mechanical arm 6 stops moving the workpiece upwardly after receiving instruction from the controller. When the mechanical arm 6 having no workpiece moves directly above the second hanging apparatus 12, the forth initial sensor detects no workpiece and directly sends the finishing signal.

Since the hanging apparatus comprises a first hanging apparatus 10 and a second hanging apparatus 12, the workpiece is subjected to two hanging process via the first hanging apparatus 10 and the second hanging apparatus 12, and thus the hanged (attached) materials on the workpiece are uniform and have strong adhesion, which further improves the processing quality of the workpiece.

Furthermore, the drying apparatus comprises a first drying apparatus 9, a second drying apparatus 11 and a third drying apparatus 13. Wherein the first drying apparatus 9 comprises a first fan drum, a first air heater mounted in the first fan drum, a fifth initial sensor for detecting whether the workpiece is positioned directly above the first fan drum or not, and a fifth working sensor for detecting whether the workpiece is positioned in the first fan drum or not. When the mechanical arm 6 mounted with the workpiece moves directly above the first drying apparatus 9, the signal of the fifth initial sensor changes, then the mechanical arm 6 receives instruction from the controller and moves the workpiece downwardly, until the workpiece is dropped into the first fan drum, the controller receives signal from the fifth working sensor and controls the mechanical arm 6 to stop moving the workpiece downwardly and controls the first air heater to work for a seventh preset time, wherein the seventh preset time is controlled by a timer and which depends on the drying requirement for different workpieces. The first air heater stops working after receiving instruction from the controller, and the mechanical arm 6 receives instruction from the controller and moves the workpiece upwardly. When sensing the workpiece, the fifth initial sensor sends a finishing signal to the controller, and the mechanical arm 6 stops moving the workpiece upwardly after receiving instruction from the controller. When the mechanical arm 6 having no workpiece moves directly above the first drying apparatus 9, the fifth initial sensor detects no workpiece and directly sends the finishing signal. Furthermore, the first drying apparatus 9 further comprises a first fan drum temperature sensor for sensing the temperature in the first fan drum. The heating of the first fan drum is achieved by the first air heater, and the temperature in the first fan drum depends on the power of the heating element in the first air heater. The operator can adjust the power of the first air heater via the first fan drum temperature sensor and a temperature indicator connected to the first fan drum temperature sensor to achieve the control of the temperature. For higher accuracy control, the control of temperature can be achieved by first fan drum temperature sensor connected to an intelligent temperature controller whose power can be adjusted by itself.

The second drying apparatus 11 comprises a second fan drum, a second air heater mounted in the second fan drum, a sixth initial sensor for detecting whether the workpiece is positioned directly above the second fan drum or not, and a sixth working sensor for detecting whether the workpiece is positioned in the second fan drum or not. When the mechanical arm 6 mounted with the workpiece moves directly above the second drying apparatus 11, the signal of the sixth initial sensor changes, then the mechanical arm 6 receives instruction from the controller and moves the workpiece downwardly, until the workpiece is dropped into the second fan drum, the controller receives signal from the sixth working sensor and controls the mechanical arm 6 to stop moving the workpiece downwardly and controls the second air heater to work for an eighth preset time, wherein the eighth preset time is controlled by a timer and which depends on the drying requirements for different workpieces. The second air heater stops working after receiving instruction from the controller, and the mechanical arm 6 receives instruction from the controller and moves the workpiece upwardly. When sensing the workpiece, the sixth initial sensor sends a finishing signal to the controller, and the mechanical arm 6 stops moving the workpiece upwardly after receiving instruction from the controller. When the mechanical arm 6 having no workpiece moves directly above the second drying apparatus 11, the sixth initial sensor detects no workpiece and directly sends the finishing signal. Furthermore, the second drying apparatus 11 further comprises a second fan drum temperature sensor for sensing the temperature in the second fan drum. The heating of the second fan drum is achieved by the second air heater, and the temperature in the second fan drum depends on the power of the heating element in the second air heater. The operator can adjust the power of the second air heater via the second fan drum temperature sensor and a temperature indicator connected to the second fan drum temperature sensor to achieve the control of the temperature. For higher accuracy control, the control of temperature can be achieved by second fan drum temperature sensor connected to an intelligent temperature controller whose power can be adjusted by itself.

The third drying apparatus 13 comprises a third fan drum, a third air heater mounted in the third fan drum, a seventh initial sensor for detecting whether the workpiece is positioned directly above the third fan drum or not, and a seventh working sensor for detecting whether the workpiece is positioned in the third fan drum or not. When the mechanical arm 6 mounted with the workpiece moves directly above the third drying apparatus 13, the signal of the seventh initial sensor changes, then the mechanical arm 6 receives instruction from the controller and moves the workpiece downwardly, until the workpiece is dropped into the third fan drum, the controller receives signal from the seventh working sensor and controls the mechanical arm 6 to stop moving the workpiece downwardly and controls the third air heater to work for a ninth preset time, wherein the ninth preset time is controlled by a timer and which depends on the drying requirements for different workpieces. The third air heater stops working after receiving instruction from the controller, and the mechanical arm 6 receives instruction from the controller and moves the workpiece upwardly. When sensing the workpiece, the seventh initial sensor sends a finishing signal to the controller, and the mechanical arm 6 stops moving the workpiece upwardly after receiving instruction from the controller. When the mechanical arm 6 having no workpiece moves directly above the third drying apparatus 13, the third initial sensor detects no workpiece and directly sends the finishing signal. Furthermore, the third drying apparatus 13 further comprises a third fan drum temperature sensor for sensing the temperature in the third fan drum. The heating of the third fan drum is achieved by the third air heater, and the temperature in the third fan drum depends on the power of the heating element in the third air heater. The operator can adjust the power of the third air heater via the third fan drum temperature sensor and a temperature indicator connected to the third fan drum temperature sensor to achieve the control of the temperature. For higher accuracy control, the control of temperature can be achieved by third fan drum temperature sensor connected to an intelligent temperature controller whose power can be adjusted by itself.

The first cleaning apparatus 7, the second cleaning apparatus 8, the first drying apparatus 9, the first hanging apparatus 10, the second drying apparatus 11, the second hanging apparatus 12 and the third drying apparatus 13 are arranged sequentially. The powers of the first air heater, the second air heater and the third air heater can be adjusted continuously within 100 W-1000 W, and the temperatures in the first fan drum, the second fan drum, and the third fan drum can be adjusted continuously within 40° C.-120° C. so as to make drying apparatus adapt to the drying requirement for different workpiece and improve the universality of the loading apparatus. Wherein the cleaning time for each workpiece is preferably 1 minute-5 minutes; drying temperature is 40° C.-120° C., drying time is 1 min-3 minutes, and the slurry concentration is as follows: the slurry comprises in mass fraction 50%-60% of Ni-based alloy powder and 50%-40% of an additive. The hanging time for individual workpiece can be adjusted within 10 minutes-20 minutes.

Before starting the above procedures, it is necessary to make sure that the following initial conditions for normal operation of the system has been met.

The temperature of the cleaning liquid meets the process requirement. The material levels in the dipping tanks of the first material barrel and the second material barrel meet the process requirement. Mechanical arm 6 is rightly powered. Each protecting element of the system trouble-freely works.

Abnormal power cut, apparatus failure, insufficient preparedness before operating and other factors may alter the above conditions. After starting, the system will detect and repair the above conditions. When the above conditions are met and output status of each sensor is in completion status, the system operating is allowed. Through the controller and the mechanical arm 6, the automation of the loading apparatus is achieved, which reduces labor intensity of the operator for cleaning the workpiece.

Preferably, the loading apparatus comprises a clamping apparatus 14, a rotating platform 3, a driving apparatus for rotating the rotating platform 3, and eight mechanical arms 6, wherein the eight mechanical arms 6 are mounted on the rotating platform 3 and distributed uniformly along the circumference of a circle centered on the rotating center of the rotating platform 3. The clamping apparatus 14, the first cleaning apparatus 7, and second cleaning apparatus 8, the first drying apparatus 9, the first hanging apparatus 10, the second drying apparatus 11, the second hanging apparatus 12 and the third drying apparatus 13 are mounted on the outer periphery of the rotating platform 3 and distributed uniformly along the circumference of a circle centered on the rotating center of the rotating platform 3. The clamping apparatus 14 is positioned between the first cleaning apparatus 7 and the third drying apparatus 13. The first initial sensor, the second initial sensor, the third initial sensor, the forth initial sensor, the fifth initial sensor, the sixth initial sensor, and the seventh initial sensor finish sending signals to the controller, the instruction key positioned on the clamping apparatus 14 becomes effective, and when the instruction key is pressed, the rotating platform 3 rotates 45 degrees after receiving instruction from the controller. Wherein the mechanical arms 6 may be retractable unit heads which can bring the clamp and workpiece rotating and moving upwardly and downwardly. When the rotating platform 3 is in the initial position, the mechanical arms 6 and the workpiece are directly above individual auxiliary equipment, wherein the auxiliary equipments comprise the first cleaning apparatus 7, the second cleaning apparatus 8, the first drying apparatus 9, the first hanging apparatus 10, the second drying apparatus 11, the second hanging apparatus 12 and the third drying apparatus 13. When the clamp and workpiece on the mechanical arms 6 deviate from the corresponding apparatus therebelow, the operator can manually adjust the position of the rotating platform 3, or start and rotate the rotating platform 3 by controller after receiving signals from the workpiece position sensor until the rotating platform 3 is at its right position. The linear speed of the rotating platform can be adjusted continuously within 1 m/min to 5 m/min. The effective lifting stroke of the unit head is 400 mm, and the speed can be adjusted continuously within 1 m/min to 3 m/min to adapt to the process requirements of different workpieces.

Furthermore, the loading apparatus comprises a loading position sensor for detecting whether the mechanical arm 6 enters into the loading position or not. In addition to the mechanical arms 6 directly over the charging platform and in throwing operation, other mechanical arms 6 rotate the workpiece by the motor of the mechanical arms 6 at a speed of 200-300 r/min. When any mechanical arm 6 enters into the loading position, the loading position sensor senses the mechanical arm 6 and sends signal to the controller, the controller sends instruction to stop the rotation of the mechanical arm 6. When loading is complete, the controller sends instruction for rotating the platform, and when the mechanical arm 6 leaves from the loading position, the mechanical arm 6 rotates at a speed of 200-300 r/min, causing the rotation of the workpiece. The rotating motor of the mechanical arm 6 holds the workpiece thereon, such that the workpiece rotates during the whole operation of the mechanical arm 6. Such design of the spin of the workpiece facilitates the cleaning of the workpiece, allow the hot air uniformly passes through the inner and outer surfaces of the workpiece due to the spin of the workpiece in the drying process, and allow the slurry flow uniformly through the inner and outer surfaces of the workpiece to improve the quality of hanging due to the spin of the workpiece in the hanging process.

Preferably, the loading apparatus comprises a workpiece detecting sensor. After starting, the apparatus automatically detects the workpiece. When a workpiece is remained on the mechanical arms 6, the controller will receive signal from the workpiece detecting sensor and prohibit the operating of apparatus. When there is no remaining workpiece, the sensing sensor does not send signal and the controller allows the apparatus operate. The above condition is detected automatically by the system, and repaired manually. When the condition is met, the operation is allowed, otherwise, the operating instruction is invalid.

When there are multiple mechanical arms 6, it is necessary to make sure that no remaining workpiece on each mechanical arm 6, such that the operation of the loading apparatus is allowed. Since the workpiece must be processed continuously and the middle pause will affect the processing quality, the remaining workpiece must be taken out and cleaned for reuse.

The loading apparatus processes the workpiece in each work position successively by rotating the workpiece through the mechanical arms 6 and rotating platform 3, thus achieve simultaneous processing of multiple workpiece and further improves the operating efficiency of the loading apparatus. The provision of a workpiece detecting sensor for the loading apparatus avoids remaining workpiece on the loading apparatus, guarantees the continuity of processing each workpiece and further improves the processing quality of workpiece.

Furthermore, the first hanging apparatus 10 further comprises a first cover mounted on the first material barrel. When the workpiece moves in a direction toward the first material barrel, the first cover is opened after receiving instruction from the controller; when the workpiece is removed out of the first material barrel, the first cover is closed after receiving instruction from the controller, wherein the cover can be provided with a telescopic link or a telescopic cylinder and is controlled by the controller.

The second hanging apparatus 12 further comprises a second cover mounted on the first material barrel. When the workpiece moves in a direction toward the second material barrel, the second cover is opened after receiving instruction from the controller; when the workpiece is removed out of the second material barrel, the second cover is closed after receiving instruction from the controller. The provision of the first cover and the second cover avoids impurities falling into the first material barrel and the second material barrel when the first hanging apparatus and the second hanging apparatus are not in use, and thus further improves the processing quality of workpiece and avoids contamination of the workpiece by external impurities.

Furthermore, the first hanging apparatus 10 further comprises a first feeding apparatus, and a first initial material level sensor and a first working material level sensor mounted on the first material barrel and for detecting the material level in the first material barrel. When the material level is below the position of the first initial material level sensor, the controller receives signal from the first initial material level sensor and controls the first feeding apparatus to feed material into the first material barrel; when the material level is above the position of the first working material level sensor, the controller receives signal from the first working material level sensor and controls the first feeding apparatus to stop feeding material into the first material barrel.

The second hanging apparatus 12 further comprises a second feeding apparatus, and a second initial material level sensor and a second working material level sensor mounted on the second material barrel and for detecting the material level in the second material barrel. When the material level is below the position of the second initial material level sensor, the controller receives signal from the second initial material level sensor and controls the second feeding apparatus to feed material into the second material barrel; when the material level is above the position of the second working material level sensor, the controller receives signal from the second working material level sensor and controls the second feeding apparatus to stop feeding material into the second material barrel. Before the start of the operation, the operator should examine whether the material level of the storage tank of the hanging device in the first feeding apparatus and the second feeding apparatus meets the process requirement or not. Only when the process requirement is met, the next step is performed. When the material level in the dipping tank is below the process requirement, the material level controller output is error, the automatic feeding program is started to feed material into the dipping tank; when the material level meets the process requirement, the material level controller is converted to a material level maintaining state and the output state is right. The timely feeding of the first hanging apparatus 10 and the second hanging apparatus 12 via the first feeding apparatus and the second feeding apparatus avoids shutdown of the loading apparatus due to insufficient material in the first hanging apparatus 10 and the second hanging apparatus 12, and thus improves the processing efficiency of the workpiece.

Of course, the first hanging apparatus 10 further comprises a first feeding sensor for monitoring the material level in the first feeding apparatus and a first feeding alarm device, when the material level in the first feeding apparatus is below the position of the first feeding sensor, the controller receives signal from the first feeding sensor and controls the first feeding alarm device to send an alarm. The second hanging apparatus 12 further comprises a second feeding sensor for monitoring the material level in the second feeding apparatus and a second feeding alarm device, when the material level in the second feeding apparatus is below the position of the second feeding sensor, the controller receives signal from the second feeding sensor and controls the second feeding alarm device to send an alarm. Wherein the first feeding apparatus and the second feeding apparatus are fed manually. The provision of the first feeding sensor and the second feeding sensor and the alarms of the first feeding alarm device and the second feeding alarm device are advantageous for the operator to timely know the condition of the materials in the first feeding apparatus and the second apparatus to guarantee continuous operation of feeding apparatus, improving the processing efficiency of the workpiece.

Furthermore, the first cleaning apparatus 7 further comprises a first cleaning liquid temperature sensor and a first cleaning liquid heating means for heating the cleaning liquid in the first cleaning box, wherein the cleaning liquid temperature sensor is used for sensing the temperature of the liquid in the first cleaning box, the cleaning temperature for the first cleaning apparatus 7 can be adjusted continuously within 30° C.-80° C. to adapt to the cleaning temperature of different workpieces. When the temperature of the cleaning liquid in the first cleaning box is below the preset minimum temperature value, the controller will receive signal from the first cleaning liquid temperature sensor and control the first cleaning liquid heating means entering into a heating state; when the temperature of the cleaning liquid in the first cleaning box is above the preset maximum temperature value, the controller will receive signal from the first cleaning liquid temperature sensor and control the first cleaning liquid heating means entering into a temperature maintaining state.

The second cleaning apparatus 8 further comprises a second cleaning liquid temperature sensor and a second cleaning liquid heating means for heating the cleaning liquid in the second cleaning box, wherein the cleaning liquid temperature sensor is used for sensing the temperature of the liquid in the second cleaning box, the cleaning temperature for the second cleaning apparatus 8 can be adjusted continuously within 30° C.-80° C. to adapt to the cleaning temperature of different workpieces. When the temperature of the cleaning liquid in the second cleaning box is below the preset minimum temperature value, the controller will receive signal from the second cleaning liquid temperature sensor and control the second cleaning liquid heating means entering into a heating state; when the temperature of the cleaning liquid in the second cleaning box is above the preset maximum temperature value, the controller will receive signal from the second cleaning liquid temperature sensor and control the second cleaning liquid heating means entering into a temperature maintaining state. The provision of the temperature sensor and heating means avoids the situation in which the temperature of the cleaning liquid cannot meet the requirement of cleaning temperature and further improves the processing quality of the workpiece.

The above motor, heating means and air heater are designed with protection means for short circuit, overload or over temperature; when any protection relay operates, the output of the comprehensive protection relay is error and the controller controls the apparatus to stop working; when no protection relay operates, the output is right and the controller controls each component to work normally.

The loading apparatus programs and processes data via computer, and achieves the logic and cycle control via controller and sensors. The motor is controlled by variable frequency.

The rotating platform 3 is powered by safe slide wire, and the information of control relay on the rotating platform 3 is wirelessly delivered.

After loading, in the present disclosure, the half-finished wear resistant impeller is subjected to a vacuum fusion sintering to obtain a wear resistant impeller. In the present disclosure, the vacuum fusion sintering is as follows:

1) increasing the temperature for the vacuum fusion sintering to 150~250° C. within 20~40 minutes, and maintaining this temperature for 5~30 minutes;

2) further increasing the temperature to 300~350° C. within 30~60 minutes, and maintaining this temperature for 10~20 minutes;

3) further increasing the temperature to 400~500° C. within 60~90 minutes, and maintaining this temperature for 10~30 minutes;

4) further increasing the temperature to 700~900° C. within 30~70 minutes, and maintaining this temperature for 5~10 minutes;

5) further increasing the temperature to 900~1000° C. within 30~60 minutes, and maintaining this temperature for 5~15 minutes;

6) further increasing the temperature to 1050~1200° C. within 30~60 minutes, and maintaining this temperature for 5~15 minutes.

In the present disclosure, it is preferably to increase the temperature for the vacuum fusion sintering to 150~250° C. within 20~40 minutes and keep this temperature for 5~30 minutes, more preferably to increase the temperature for the vacuum fusion sintering to 160~240° C. within 22~38 minutes and keep this temperature for 7~20 minutes, and most preferably to increase the temperature for the vacuum fusion sintering to 170~230° C. within 25~35 minutes and keep this temperature for 10~15 minutes to finish the step 1). The present disclosure has no particular limitation to the rate of increasing the temperature in the step 1), as long as the desired temperature can be achieved within allotted time.

After completion of the step 1), in the present disclosure, it is preferably to further increase the temperature to 300~350° C. within 30~60 minutes and keep this temperature for 10~20 minutes, more preferably to further increase the temperature to 310~340° C. within 35~55 minutes and keep this temperature for 12~18 minutes, and most preferably to further increase the temperature to 320~330° C. within 40~50 minutes and keep this temperature for 13~17 minutes to finish the step 2). The present disclosure has no particular limitation to the rate of increasing the temperature in the step 2), as long as the desired temperature can be achieved within allotted time.

After completion of the step 2), in the present disclosure, it is preferably to further increase the temperature to 400~500° C. within 60~90 minutes and keep this temperature for 10~30 minutes, more preferably to further increase the temperature to 410~490° C. within 65~85 minutes and keep this temperature for 12~28 minutes, and most preferably to further increase the temperature to 420~480° C. within 70~80 minutes and keep this temperature for 13~25 minutes to finish the step 3). The present disclosure has no particular limitation to the rate of increasing the temperature in the step 3), as long as the desired temperature can be achieved within allotted time.

After completion of the step 3), in the present disclosure, it is preferably to further increase the temperature to 700~900° C. within 30~70 minutes and keep this temperature for 5~10 minutes, more preferably to further increase the temperature to 710~890° C. within 35~65 minutes and keep this temperature for 6~9 minutes, and most preferably to further increase the temperature to 720~880° C. within 40~60 minutes and keep this temperature for 7~8 minutes to finish the step 4). The present disclosure has no particular limitation to the rate of increasing the temperature in the step 4), as long as the desired temperature can be achieved within allotted time.

After completion of the step 4), in the present disclosure, it is preferably to further increase the temperature to 900~1000° C. within 30~60 minutes and keep this temperature for 5~15 minutes, more preferably to further increase the temperature to 890~950° C. within 35~55 minutes and keep this temperature for 6~14 minutes, and most preferably to further increase the temperature to 880~940° C. within 40~50 minutes and keep this temperature for 7~13 minutes to finish the step 5). The present disclosure has no particular limitation to the rate of increasing the temperature in the step 5), as long as the desired temperature can be achieved within allotted time.

After completion of the step 5), in the present disclosure, it is preferably to further increase the temperature to 1080~1150° C. within 30~60 minutes and keep this temperature for 5~15 minutes, more preferably to further increase the temperature to 1090~1140° C. within 35~55 minutes and keep this temperature for 6~14 minutes, and most preferably to further increase the temperature to 1100~1130° C. within 40~50 minutes and keep this temperature for 7~13 minutes to finish the vacuum fusion sintering of the half-finished wear resistant impeller, such that the hard surface layer of Ni based alloy powder and corresponding wear resistant impeller are obtained.

Figure 3:
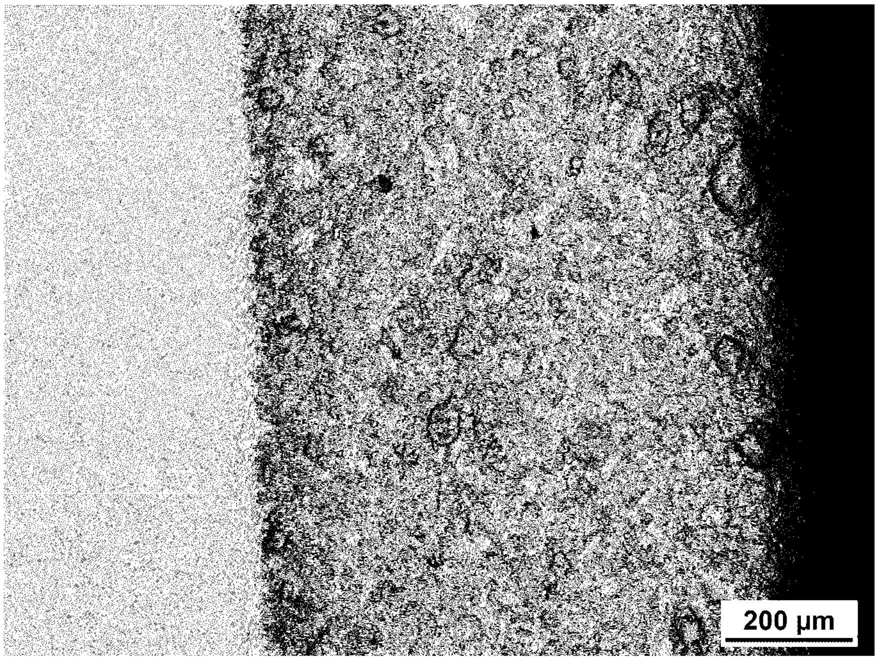
FIG. 3 is a metallographic photograph of the hard surface layer of the wear resistant impeller provided in the present disclosure.
Figure 4:
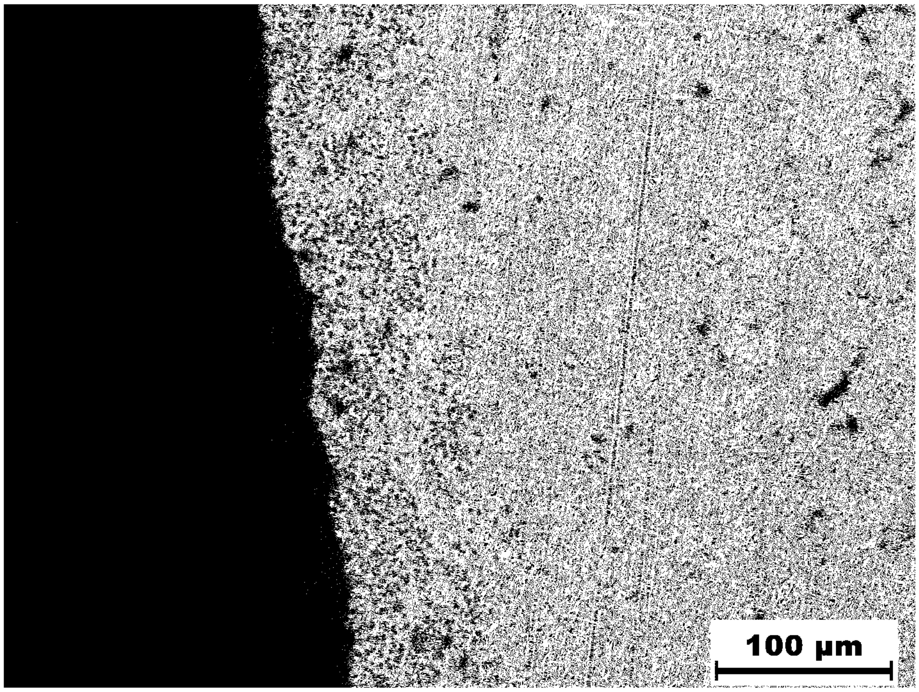
FIG. 4 is a metallographic photograph of the wear resistant impeller provided in the present disclosure.

After the wear resistant impeller is obtained, in the present disclosure, metallographic test is performed, and the result is shown in FIGS. 3 and 4. FIG. 3 is a metallographic photograph of the hard surface layer of the wear resistant impeller provided in the present disclosure; and FIG. 4 is a metallographic photograph of the wear resistant impeller provided in the present disclosure. As can be seen in FIGS. 3 and 4, the hard surface layer on the surface of the wear resistant impeller provided in the present disclosure has homogeneous structure and strong metallurgical bonding with the impeller matrix.

The wear resistance of the wear resistant impeller provided in the present disclosure is tested by Rockwell hardness tester, and the result shows that the wear resistant impeller provided in the present disclosure has a hardness of up to 80 HRC, which proves that the wear resistant impeller provided in the present disclosure has excellent wear resistance.

The present disclosure provides a wear resistant material manufactured from a Ni-based alloy powder and an additive, wherein the Ni-based alloy powder comprises the following components in mass fraction: C: 0.1~1.1%, Si: 0.5~6.0%, Fe: 2.5~15.0%, B: 0.2~5.0%, $CrB_2$: 6.0~26.0%, and the balance of Ni. In the present disclosure, the Ni-based alloy powder is used as the main component, which improves the wear resistance of the wear resistant material. Experimental data show that, the wear resistant material provided in the present disclosure has a hardness of 70~80 HRC and excellent wear resistance. The present disclosure also provides a wear resistant impeller and manufacture method thereof, wherein the wear resistant material provided in the present disclosure is used as the hard surface layer of the wear resistant impeller, and the wear resistant material is loaded onto the surface of the impeller matrix to obtain a blank, the blank is then converted into finished product via vacuum fusion sintering, the hard surface layer formed from the wear resistant material of the present disclosure has more homogeneous structure and metallurgical bonding between the hard surface layer and the surface of the impeller matrix. The obtained hard surface layer has dense structure and homogeneous tissue and enhanced bonding strength between the hard surface layer and the surface of the impeller, thus further improving the wear resistance of the wear resistant impeller.

In order to further illustrate the present disclosure, detailed descriptions of the wear resistant material, wear resistant impeller and manufacture method thereof are provided in combination with following examples; however, these examples should not be considered as limitation to the scope of the present disclosure.

Example 1

On mass fraction basis, 0.3% of carbon powder, 2.5% of molybdenum powder, 6% of iron powder, 0.6% boron powder, 15% of tungsten carbide powder, 14% chromium boride and 61.6% nickel powder were mixed together to obtain a mixture.

500 mL anhydrous ethyl alcohol was added into 1000 g of the mixture. The mixture was subjected to a wet milling for 24 hours, then taken out and dried in a vacuum drying oven at 80° C. for 1 hour. Finally, the mixture was sieved with a screen having a size of 100 mesh to obtain the Ni-based alloy powder.

4.0 g of glycerol trioleate, 120 g of polyvinyl butyral, 1680 mL of anhydrous ethyl alcohol, 20 g of di-n-octyl phthalate, 20.0 g of glycerol and 5.0 g of cyclohexanone were mixed together to obtain the additive. 500 g of the additive was mixed with the sieved Ni-based alloy powder to obtain a slurry.

At 60° C., an impeller was cleaned in the G105 Metal Cleaner for 5 minutes, subsequent by an ultrasonic cleaning with a power of 450 W for 3 minutes. The cleaned impeller was dried in a hot air box at 90° C. for 3 minutes. The dried impeller was immersed in the slurry and rotated at a speed of 600 r/min for 10 minutes to hang/attach the slurry uniformly onto the surface of the impeller. The impeller was dried at 60° C. for 2 minutes. The above loading (attaching) and subsequent drying were repeated, to obtain the half-finished wear resistant impeller.

The obtained half-finished wear resistant impeller was subjected to a vacuum fusion sintering to obtain a wear resistant impeller, wherein the vacuum fusion sintering was as follows.

The temperature increasing process: the temperature was gradually increased to 150° C. within 20 minutes and kept for 5 minutes; the temperature was further increased to 300° C. within 30 minutes and kept for 10 minutes; the temperature was further increased to 400° C. within 60 minutes and kept for 10 minutes; the temperature was further increased to 700° C. within 30 minutes and kept for 5 minutes; the temperature was further increased to 900° C. within 30 minutes and kept for 5 minutes; the temperature was further increased to 1080° C. within 30 minutes and kept for 5 minutes; and then cooled in the furnace.

The wear resistant impeller obtained in the above example according to the above technical solution was subjected to a performance test, and the result showed that the wear resistant impeller obtained in the example has a hardness of 72.0 HRC.

Example 2

On mass fraction basis, 0.2% of carbon powder, 3.0% of molybdenum powder, 4.5% of iron powder, 3.5% of boron powder, 18% of tungsten carbide powder, 17.5% of chromium boride and 53.3% of nickel powder were mixed together to obtain a mixture.

600 mL of anhydrous ethyl alcohol was added into 1000 g of the mixture. The mixture was subjected to a wet milling for 24 hours, then taken out and dried in a vacuum drying oven at 80° C. for 1 hour. Finally, the mixture was sieved with a screen having a size of 80 mesh to obtain the Ni-based alloy powder.

4.0 g of glycerol trioleate, 120 g of polyvinyl butyral, 1680 ml of anhydrous ethyl alcohol, 20.0 g of di-n-octyl phthalate, 20.0 g of glycerol and 5.0 g of cyclohexanone were mixed together to obtain the additive. 400 g of the additive was mixed with the sieved Ni-based alloy powder to obtain a slurry.

At 30° C., an impeller was cleaned in the G105 Metal Cleaner for 3 minutes, and then cleaned with an ultrasonic cleaning with a power of 450 W for 2 minutes. The cleaned impeller was dried in a hot air box at 60° C. for 3 minutes. The dried impeller was immersed in the slurry and rotated at a speed of 300 r/min for 7 minutes to attach the slurry uniformly onto the surface of the impeller. The impeller was dried at 60° C. for 3 minutes. The above loading (attaching) and subsequent drying were repeated, to obtain the half-finished wear resistant impeller.

The obtained half-finished wear resistant impeller was subjected to a vacuum fusion sintering to obtain a wear resistant impeller, wherein the vacuum fusion sintering was as follows.

The temperature increasing process: the temperature was gradually increased to 250° C. within 40 minutes and kept for 10 minutes; the temperature was further increased to 350° C. within 60 minutes and kept for 20 minutes; the temperature was further increased to 500° C. within 90 minutes and kept for 30 minutes; the temperature was further increased to 900° C. within 70 minutes and kept for 10 minutes; the temperature was further increased to 1000° C. within 60 minutes and kept for 15 minutes; the temperature was further increased to 1150° C. within 60 minutes and kept for 15 minutes; and then cooled in the furnace.

The wear resistant impeller obtained in the above example according to the above technical solution was subjected to a performance test, and the result showed that the wear resistant impeller obtained in the example has a hardness of 76.8 HRC.

Example 3

On mass fraction basis, 0.15% of carbon powder, 2.0% of molybdenum powder, 9.5% of iron powder, 4.0% of boron powder, 10% of tungsten carbide powder, 23% of chromium boride and 51.35% of nickel powder were mixed together to obtain a mixture.

800 mL of anhydrous ethyl alcohol was added into 1000 g of the mixture. The mixture was subjected to a wet milling for 40 hours, then taken out and dried in a vacuum drying oven at 80° C. for 1 hour. Finally, the mixture was sieved with a screen having a size of 60 mesh to obtain the Ni-based alloy powder.

4.0 g of glycerol trioleate, 120 g of polyvinyl butyral, 1680 mL of anhydrous ethyl alcohol, 20.0 g of di-n-octyl phthalate, 20.0 g of glycerol and 5.0 g of cyclohexanone were mixed together to obtain the additive. 450 g of the additive was mixed with the sieved Ni-based alloy powder to obtain a slurry.

At 80° C., an impeller was cleaned in the G105 Metal Cleaner for 3 minutes, and then cleaned with an ultrasonic cleaning with a power of 450 W for 4 minutes. The cleaned impeller was dried in a hot air box at 100° C. for 3 minutes. The dried impeller was immersed in the slurry and rotated at a speed of 500 r/min for 8 minutes to attach the slurry uniformly onto the surface of the impeller. The impeller was dried at 80° C. for 3 minutes. The above loading (attaching) and subsequent drying were repeated, to obtain the half-finished wear resistant impeller.

The obtained wear resistant impeller was subjected to a vacuum fusion sintering to obtain a wear resistant impeller, wherein the vacuum fusion sintering was as follows.

The temperature increasing process: the temperature was gradually increased to 200° C. within 30 minutes and kept for 8 minutes; the temperature was further increased to 320° C. within 50 minutes and kept for 15 minutes; the temperature was further increased to 450° C. within 75 minutes and kept for 20 minutes; the temperature was further increased to 800° C. within 30-70 minutes and kept for 8 minutes; the temperature was further increased to 950° C. within 50 minutes and kept for 10 minutes; the temperature was further increased to 1120° C. within 500 minutes and kept for 9 minutes; and then cooled in the furnace.

The wear resistant impeller obtained in the above example according to the above technical solution was subjected to a performance test, and the result showed that the wear resistant impeller obtained in the above example has a hardness of 71.5 HRC.

As can be seen from the above examples, the wear resistant material provided in the present disclosure uses a Ni-based alloy powder as the main component, and by loading and vacuum fusion sintering, the hard surface layer obtained from the wear resistant material has more homogeneous structure and achieve the metallurgical bonding between the hard surface layer and the surface of the impeller, enhance the bonding strength between the hard surface layer and the surface of the impeller and thus improve the wear resistance of the wear resistant impeller.

The above description is only the preferable embodiments of the present disclosure. It should be noted that, changes and modifications can be made by those skilled in the art without departing from the principles of the present disclosure, and those changes and modifications should be considered as in the scope of the present disclosure.

What is claimed is:

1. A wear resistant material comprising a Ni-based alloy powder and an additive, wherein the Ni-based alloy powder consists of the following components in mass fraction:

0.3% of carbon powder, 2.5% of molybdenum powder, 6% of iron powder, 0.6% boron powder, 15% of tungsten carbide powder, 14% chromium boride and 61.6% nickel powder;

wherein the additive comprises a mixture of the following components:

4 parts per mass of glycerol trioleate, 120 parts per mass of polyvinyl butyral, 1326 parts per mass of anhydrous ethyl alcohol, 20 parts per mass of di-n-octyl phthalate, 20 parts per mass of glycerol and 5 parts per mass of cyclohexanone;

wherein the wear resistant material comprises 500 parts per mass of the additive and 1000 parts per mass of the Ni-based alloy powder.

2. A wear resistant impeller having a hard surface layer on the surface thereof, wherein the hard surface layer is made from the wear resistant material according to claim 1.

3. The wear resistant impeller according to claim 2, wherein the hard surface layer has a thickness of 0.02~0.30 mm.

4. A method for manufacturing a wear resistant impeller, comprising the following steps:

A) mixing a Ni-based alloy powder and an additive to obtain a slurry, wherein the Ni-based alloy powder consists of the following components in mass fraction:

0.3% of carbon powder, 2.5% of molybdenum powder, 6% of iron powder, 0.6% boron powder, 15% of tungsten carbide powder, 14% chromium boride and 61.6% nickel powder;

B) loading the slurry obtained in the step A) onto the surface of an impeller to obtain a half-finished wear resistant impeller;

C) subjecting the half-finished wear resistant impeller obtained in the step B) to vacuum fusion sintering to obtain a wear resistant impeller, wherein the additive is comprises a the mixture of the following components:

4 parts per mass of glycerol trioleate, 120 parts per mass of polyvinyl butyral, 1326 parts per mass of anhydrous ethyl alcohol, 20 parts per mass of di-n-octyl phthalate, 20 parts per mass of glycerol and 5 parts per mass of cyclohexanone;

wherein the slurry comprises 500 parts per mass of the additive and 1000 parts per mass of the Ni-based alloy powder.

5. The method according to claim 4, wherein the vacuum fusion sintering is specifically as follows:

1) increasing the temperature for the vacuum fusion sintering to 150~250° C. within 20~40 minutes, and maintaining this temperature for 5~30 minutes;

2) further increasing the temperature to 300~350° C. within 30~60 minutes, and maintaining this temperature for 10~20 minutes;

3) further increasing the temperature to 400~500° C. within 60~90 minutes, and maintaining this temperature for 10~30 minutes;

4) further increasing the temperature to 700~900° C. within 30~70 minutes, and maintaining this temperature for 5~10 minutes;

5) further increasing the temperature to 900~1000° C. within 30~60 minutes, and maintaining this temperature for 5~15 minutes; and 6) further increasing the temperature to 1050~1200° C. within 30~60 minutes, and maintaining this temperature for 5~15 minutes.

6. A wear resistant material comprising a Ni-based alloy powder and an additive, wherein the Ni-based alloy powder consists of the following components in mass fraction:

0.2% of carbon powder, 3.0% of molybdenum powder, 4.5% of iron powder, 3.5% of boron powder, 18% of tungsten carbide powder, 17.5% of chromium boride and 53.3% of nickel powder;

wherein the additive comprises a mixture of the following components:

4 parts per mass of glycerol trioleate, 120 parts per mass of polyvinyl butyral, 1326 parts per mass of anhydrous ethyl alcohol, 20 parts per mass of di-n-octyl phthalate, 20 parts per mass of glycerol and 5 parts per mass of cyclohexanone;

wherein the wear resistant material comprises 400 parts per mass of the additive and 1000 parts per mass of the Ni-based alloy powder.

7. A wear resistant material comprising a Ni-based alloy powder and an additive, wherein the Ni-based alloy powder consists of the following components in mass fraction:

0.15% of carbon powder, 2.0% of molybdenum powder, 9.5% of iron powder, 4.0% of boron powder, 10% of tungsten carbide powder, 23% of chromium boride and 51.35% of nickel powder;

wherein the additive comprises a mixture of the following components:

4 parts per mass of glycerol trioleate, 120 parts per mass of polyvinyl butyral, 1326 parts per mass of anhydrous ethyl alcohol, 20 parts per mass of di-n-octyl phthalate, 20 parts per mass of glycerol and 5 parts per mass of cyclohexanone;

wherein the wear resistant material comprises 450 parts per mass of the additive and 1000 parts per mass of the Ni-based alloy powder.

* * * * *